United States Patent
Wang et al.

(10) Patent No.: US 9,584,399 B2
(45) Date of Patent: Feb. 28, 2017

(54) PREVENTING A LOOP IN A VERTICAL STACK NETWORK

(71) Applicant: Hangzhou H3C Technologies Co., Ltd., Hangzhou (CN)

(72) Inventors: Minghui Wang, Beijing (CN); Hai Hu, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/768,204

(22) PCT Filed: Feb. 28, 2014

(86) PCT No.: PCT/CN2014/072682
§ 371 (c)(1),
(2) Date: Aug. 14, 2015

(87) PCT Pub. No.: WO2014/176948
PCT Pub. Date: Nov. 6, 2014

(65) Prior Publication Data
US 2016/0036688 A1    Feb. 4, 2016

(30) Foreign Application Priority Data

Apr. 28, 2013 (CN) .......................... 2013 1 0158433

(51) Int. Cl.
*H04L 12/28*    (2006.01)
*H04L 12/721*    (2013.01)
*H04L 12/775*    (2013.01)
*H04L 12/18*    (2006.01)
*H04L 12/751*    (2013.01)

(52) U.S. Cl.
CPC ............ *H04L 45/12* (2013.01); *H04L 12/185* (2013.01); *H04L 45/02* (2013.01); *H04L 45/583* (2013.01)

(58) Field of Classification Search
CPC ...................................................... H04L 45/12
See application file for complete search history.

(56) References Cited

U.S. PATENT DOCUMENTS 7,080,239 B2    7/2006    Uehara
8,565,124 B2 *  10/2013   Umayabashi ......... H04L 12/462
                                                     370/255

(Continued)

FOREIGN PATENT DOCUMENTS

CN    1269955    10/2000
CN    101594304  12/2009

(Continued)

OTHER PUBLICATIONS

International Search Report and Written Opinion dated May 30, 2014 issued on PCT Patent Application No. PCT/CN2014/072682 dated Feb. 28, 2014, The State Intellectual Property Office, P.R. China.

(Continued)

*Primary Examiner* — Gerald Smarth
(74) *Attorney, Agent, or Firm* — Hewlett Packard Enterprise Patent Department (57) ABSTRACT

According to an example, a Port Extender (PE) device is bundled with a Core Backbone (CB) device to prevent a loop in a vertical stack network including the PE device and the CD device.

12 Claims, 4 Drawing Sheets

(56) References Cited

U.S. PATENT DOCUMENTS

| | | | | |
|---|---|---|---|---|
| 8,958,286 | B1* | 2/2015 | Atlas | H04L 12/18 |
| | | | | 370/225 |
| 9,450,846 | B1* | 9/2016 | Huang | H04L 43/0858 |
| 2002/0150094 | A1* | 10/2002 | Cheng | H04L 12/185 |
| | | | | 370/389 |
| 2008/0267116 | A1* | 10/2008 | Kang | H04L 45/20 |
| | | | | 370/328 |
| 2009/0316584 | A1 | 12/2009 | Tanaka et al. | |
| 2010/0128658 | A1* | 5/2010 | Bentall | H04L 45/00 |
| | | | | 370/316 |
| 2010/0302936 | A1 | 12/2010 | Jain et al. | |
| 2012/0044942 | A1* | 2/2012 | Yamaguchi | G06F 13/1663 |
| | | | | 370/400 |
| 2012/0177045 | A1* | 7/2012 | Berman | H04L 12/4633 |
| | | | | 370/392 |
| 2013/0070752 | A1* | 3/2013 | Dhruv | H04L 45/44 |
| | | | | 370/351 |

FOREIGN PATENT DOCUMENTS

| | | |
|---|---|---|
| CN | 102143026 | 8/2011 |
| CN | 102394824 | 3/2012 |
| CN | 103220218 | 7/2013 |
| EP | 1359715 | 11/2003 |
| EP | 1744489 A1 | 1/2007 |
| WO | WO-0076126 | 12/2000 |

OTHER PUBLICATIONS

CN First Office Action dated Jul. 20, 2015, CN Patent Application No. 201310158433.5 dated Apr. 28, 2013, State Intellectual Property Office of the P.R. China.

Extended European Search Report, EP Application No. 14791883.3, Date: Dec. 15, 2016, pp. 1-9, EPO.

Jon Tate et al., "IBM j-type Data Center Networking Introduction," May 2010, pp. 1-286, Redbooks.

* cited by examiner

PREVENTING A LOOP IN A VERTICAL STACK NETWORK

CLAIM FOR PRIORITY

The present application is a national stage filing under 35 U.S.C 371 of PCT application number PCT/CN2014/072682, having an international filing date of Feb. 28, 2014, which claims priority to Chinese application number 201310158433.5, having a filing date of Apr. 28, 2013, the disclosures of which are hereby incorporated by reference in their entireties.

BACKGROUND

Stacking of network switching devices can bring together and closely integrate computation, storage and networking, enabling a more seamless approach to management and configuration. A stack system comprises a plurality of network switching devices which are connected together. The network switching devices in the stack system may be referred to as "member devices" of the stack system. In some cases the member devices may be configured to act as a single virtual device when receiving and forwarding packets to devices outside the stack system.

A two-level vertical stack network architecture is used in some data centers. The vertical stack network may include first and second levels as follows.

A first level comprises a stack system of connected member devices, which may be referred to as Core Backbone (CB) devices. In some examples the CB devices are connected in a ring topology. The links connecting the CB devices to each other are referred to as "stack links".

A second level comprises Port Extender (PE) devices which are connected to the CB devices in the first level. In the two-level vertical stack network, these PE devices are not connected to each other on the second level through stack links, but are indirectly connected to each other via the CB devices.

DETAILED DESCRIPTION

Figure 1:
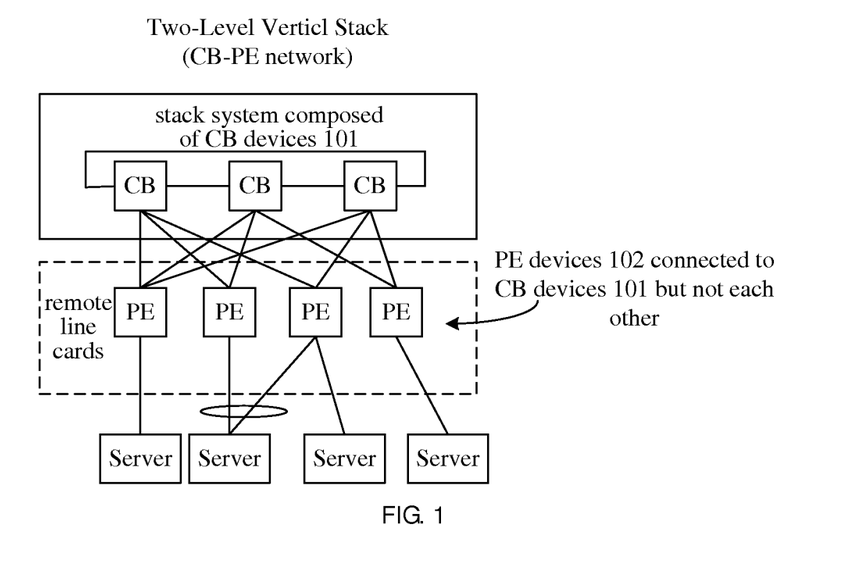
FIG. 1 is a schematic diagram illustrating a two-level vertical stack network.

FIG. 1 is a schematic diagram illustrating a two-level vertical stack network according to an example. A method for preventing a loop in a vertical stack network according to an example of the present disclosure may be implemented in the two-level vertical stack network shown in FIG. 1 and FIG. 4. The method is further described with respect to FIG. 3. As shown in FIG. 1, CB devices 101 are connected to each other through stack links to form a stack system. In some examples the stack system may be an Intelligent Resistant Fabric (IRF) stack system. A PE device may be a line card and may be in an IRF system. A PE device is connected to each of CB devices, but is not connected to any PE device. For example, PE devices 102 are connected to CB devices 101 but the PE devices are not connected to each other. Servers may communicate via the two-level stack network.

Figure 2:
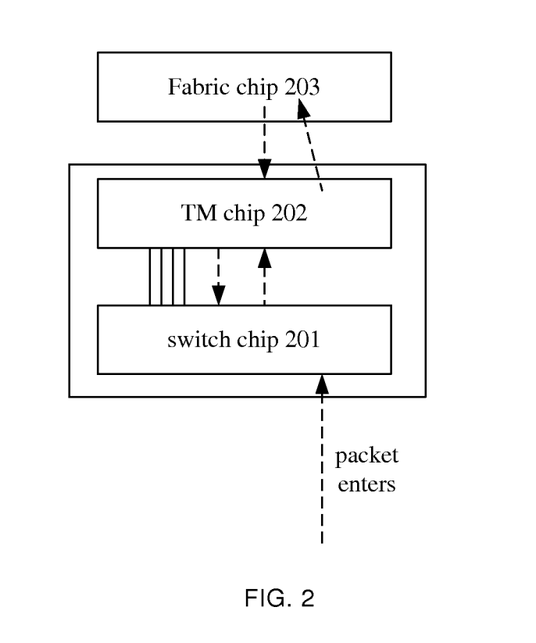
FIG. 2 is a schematic diagram illustrating data forwarding of CB device.

The vertical stack network may also be called a CB-PE network. Handling packets in a CB-PE network is now described as an example with respect to FIG. 2. FIG. 2 shows chips in a CB device, which may be used for any of the CB devices shown in FIGS. 1 and 4.

As shown in FIG. 2, in the CB-PE network, when receiving a unicast packet through an external port of a CB device, a switch chip 201 of the CB device does not forward the unicast packet locally, but sends the unicast packet to a Traffic Management (TM) chip 202. After performing traffic management for the unicast packet, the TM chip 202 sends the unicast packet to a chip, such as a fabric chip 203, where an export is located, as shown in FIG. 2.

When receiving a non-unicast packet through the external port, the switch chip 201 of the CB device performs similar processing for the non-unicast packet as that performed for the non-unicast packet. That is, the non-unicast packet is also sent to the TM chip 202 firstly. After performing traffic management for the non-unicast packet, the TM chip 202 returns the non-unicast packet to the switch chip 201. In an example, the non-unicast packet may be a broadcast packet or a multicast packet. The multicast packet may be an unknown multicast packet or a known multicast packet. An unknown-unicast packet or an unknown-multicast packet may be forwarded according to a broadcast mode, and thus may be regarded as a broadcast packet.

If the switch chip 201 receives the non-unicast packet returned by the TM chip 202 and the external port is a user port of the CB device, information of the external port may be recorded in source port information contained in the non-unicast packet. Accordingly, the switch chip 201 does not forward the non-unicast packet to the external port any more. If the external port is a stack port through which the CB device is connected to another CB device, information of the stack port may not be recorded in the source port information contained in the non-unicast packet, and thus the non-unicast packet may be forwarded to the external port again. In this case, a loop may be formed in the CB-PE network shown in FIG. 1.

In order to prevent the loop in the CB-PE network when the non-unicast packet is forwarded among CB devices having TM chips, a forwarding path of the non-unicast packet is specified through analyzing packet forwarding cases in the CB-PE network. If the non-unicast packet is not forwarded according to the specified forwarding path, the non-unicast packet may be restrained.

A method for preventing a loop is described hereinafter with reference to an example.

Figure 3:
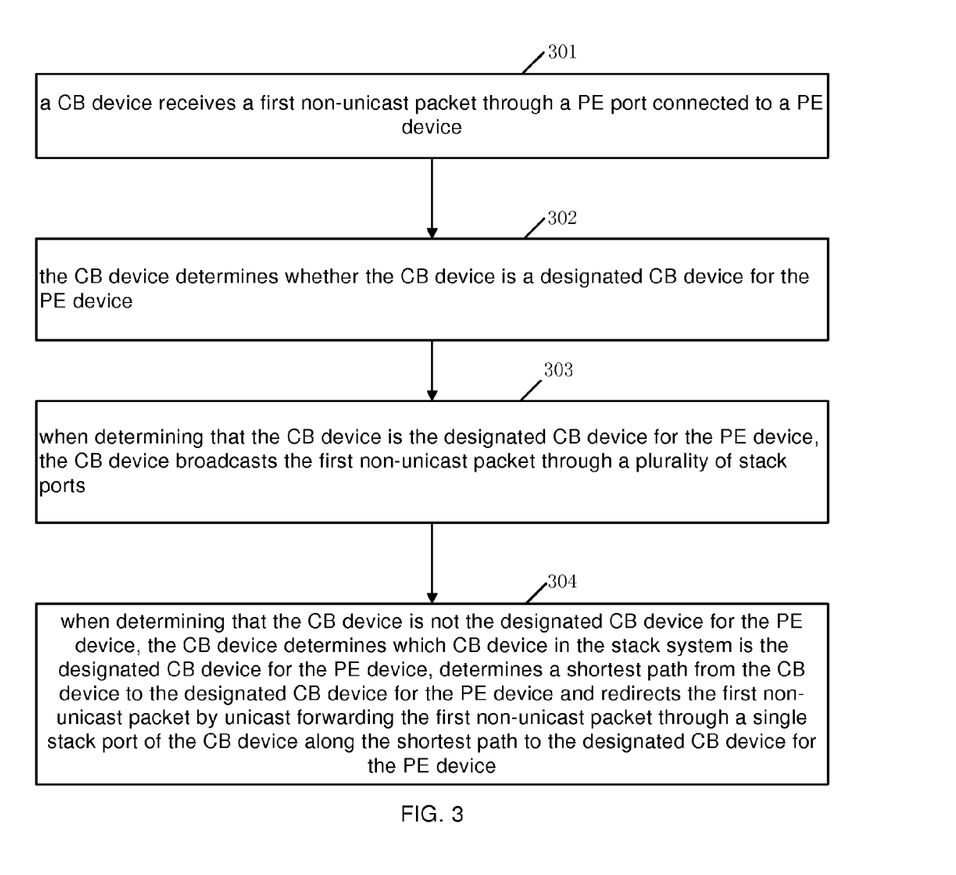
FIG. 3 is a schematic flowchart illustrating a method for preventing a loop in a vertical stack network according to an example of the present disclosure.

FIG. 3 is a schematic flowchart illustrating a method for preventing a loop in a vertical stack network according to an example of the present disclosure. As shown in FIG. 3, the method may include the following blocks.

At block 301, a CB device receives a non-unicast packet through a PE port connected to a PE device.

In an example, each PE device in a CB-PE network is bundled or associated with one CB device (e.g., only one CB device), which is referred to as the "designated CB device" for that PE device. Each PE device has a designated CB device and any non-unicast packet from the PE device are forwarded through the stack system to the designated CB device, regardless of which CB device they were originally received at. The designated CB device then acts as the source of the non-unicast packet within the stack system. As will be explained below, this has the effect that it is through the designated CB device for the PE device that all non-unicast packets of the PE device enter the stack system. Further, a CB device is not taken as a source CB device for forwarding a non-unicast packet in the stack system, unless the non-unicast packet was received from the PE device associated with the CB device. That is, a CB device only broadcasts a non-unicast packet from a PE device in the stack system, if the CB device is the designated CB device for the PE device from which the non-unicast packet was originally received.

Figure 4:
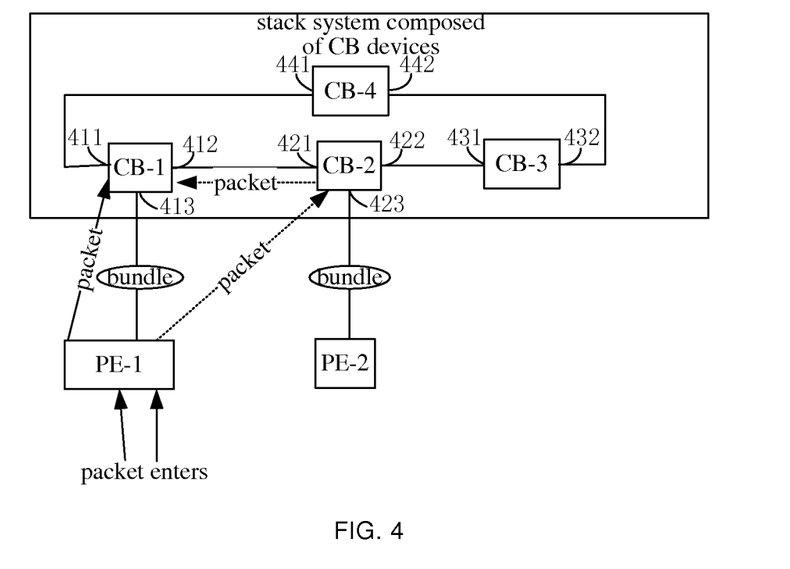
FIG. 4 is a schematic diagram illustrating a CB-PE network according to an example of the present disclosure.

In an example, each PE device may be bundled with one CB device according to traffic-based load balancing (i.e. each PE device is assigned a designated CB device). For example, FIG. 4 shows two PE devices, PE-1 and PE-2, and three CB devices, CB-1, CB-2 and CB-3. PE-1 is connected to CB-1 and CB-2 respectively as shown in FIG. 4, and PE-2 is connected to CB-2 and CB-3 respectively. According to the traffic-based load balancing, PE-1 and PE-2 are not bundled with CB-2 at the same time. In an example, PE-1 is bundled with CB-1 and PE-2 is bundled with CB-2, as shown in FIG. 4. In another example, PE-1 and PE-2 may also be bundled with other CB devices respectively according to the traffic-based load balancing. For example, PE-1 is bundled with CB-2, and PE-2 is bundled with CB-3, which is not shown in FIG. 4. In FIG. 4 the term 'bundle' in a line between a PE device and a CB device indicates that the PE device is bundled with that CB device, i.e. the CB device is the 'designated CB device' for that PE device.

At block 302, the CB device determines whether it is a designated CB device for the PE device which sent the non-unicast packet.

At block 303, when determining that the CB device is the designated CB device for the PE device which sent the non-unicast packet, the CB device broadcasts the non-unicast packet through a plurality of stack ports.

At block 304, when determining that the CB device is not the designated CB device for the PE device which sent the non-unicast packet, the CB device determines which CB device in the stack system is the designated CB device for the PE device, determines a shortest path from the CB device to the designated CB device for the PE device and redirects the non-unicast packet by unicast forwarding the non-unicast packet through a single stack port of the CB device along the shortest path to the designated CB device for the PE device.

For example, the CB device selects a stack port of the CB device according to the shortest path, and redirects the non-unicast packet through the selected stack port to the designated CB device for the PE device which sent the non-unicast packet.

In an example, a non-unicast packet sent by any PE device contains an identity of the PE device such as a name and an IP address. In this way, when the CB device receives the non-unicast packet through the PE port connected to the PE device, the CB device may determine the PE device sending the non-unicast packet according to the identity of the PE device contained in the non-unicast packet.

In an example, block 301 of FIG. 3 may further include recording (e.g., storing) a bundling relationship between each PE device and a CB device on each CB device. For example, CB-1, CB-2 and CB-3 shown in FIG. 4 all record information of the CB device bundled with PE-1 and information of the CB device bundled with PE-2. In this way, when receiving the non-unicast packet, the CB device in the stack system may easily determine whether it is bundled with the PE device sending the non-unicast packet.

In an example, a process of determining whether the CB device is bundled with the PE device sending the non-unicast packet may be implemented as follows. The CB device searches its local storage for the CB device bundled with the PE device sending the non-unicast packet. If the local storage has recorded information that the CB device itself is bundled with the PE device sending the non-unicast packet, the CB device determines that it is bundled with the PE device sending the non-unicast packet. Otherwise, the CB device determines that it is not bundled with the PE device sending the non-unicast packet.

In an example, when the CB device receives, through the PE port of the CB device, a non-unicast packet sent by a PE device bundled with the CB device, the CB device is taken as a source CB device and sends the non-unicast packet through a stack port of the CB device.

In an example, when the CB device receives a non-unicast packet through a stack port, the CB device determines whether the CB device is a designated CB device for a PE device which sent the non-unicast packet. When determining that the CB device is the designated CB device for the PE device which sent the non-unicast packet, the CB device broadcasts the non-unicast packet through the plurality of stack ports. When determining that the CB device is not the designated CB device for the PE device which sent the non-unicast packet, the CB device determines a shortest forwarding path from the CB device to the designated CB device for the PE device which sent the non-unicast packet, and unicast forwards the non-unicast packet along the shortest forwarding path to the designated CB device for the PE device which sent the non-unicast packet.

In an example, if the CB device is bundled with the PE device sending the non-unicast packet, the CB device is taken as the source CB device and sends the non-unicast packet through a stack port of the CB device.

In an example, when the CB device receives, through a stack port of the CB device, a non-unicast packet sent by another CB device as the source CB device, the CB device searches the locally recorded forwarding paths of all non-unicast packets for the forwarding path of the received non-unicast packet, forwards the received non-unicast packet through a stack port that is located on the forwarding path of the non-unicast packet, and does not forward the non-unicast packet through a stack port that is not located on the forwarding path of the non-unicast packet. In an example, the forwarding path of the non-unicast packet is specified in advance for the source CB device sending the non-unicast packet to prevent a loop.

In an example, the forwarding path of the non-unicast packet that is specified for the source CB device is specified according to an optimized path from the source CB device to another CB device in the stack system.

The optimized path from the source CB device to another CB device in the stack system is determined by following methods.

If there is one path from the source CB device to another CB device in the stack system, the path may be determined as the optimized path.

If there are at least two unequal paths from the source CB device to another CB device in the stack system, the shortest path may be determined as the optimized path.

If there are at least two equal paths from the source CB device to another CB device in the stack system, any one of the two equal paths may be determined as the optimized path as long as the loop may be avoided.

CB-1 shown in FIG. 4 is taken for instance. When CB-1 is taken as the source CB device, a method for specifying the forwarding path of the non-unicast packet to prevent the loop may be implemented as follows.

(1) Optimized paths from CB-1 to other CB devices including CB-2 to CB-4 in the stack system shown in FIG. 4 are calculated.

As shown in FIG. 4, there are two paths from CB-1 to CB-2, which include:

Path 1, CB-1→CB-2, and
Path 2, CB-1→CB-4→CB-3→CB-2.

As can be seen, there are two unequal paths from CB-1 to CB-2. Path 1 is the shortest path and thus is selected as the optimized path.

As shown in FIG. 4, there are also two paths from CB-1 to CB-3, which include:

Path 1, CB-1→CB-2→CB-3, and
Path 2, CB-1→CB-4→CB-3.

As can be seen, there are two equal paths from CB-1 to CB-3. Any one of the two equal paths may be selected as the optimized path as long as the loop may be avoided. For example, Path 1 may be selected as the optimized path.

As shown in FIG. 4, there are also two paths from CB-1 to CB-4, which include:

Path 1, CB-1→CB-2→CB-3→CB-4, and
Path 2, CB-1→CB-4.

As can be seen, there are two unequal paths from CB-1 to CB-4. Path 2 is the shortest path and thus is selected as the optimized path.

(2) The optimized paths from CB-1 to other CB devices including CB-2 to CB-4 are used as the forwarding path of CB-1 in the stack system shown in FIG. 4, and are recorded on the CB devices including CB-2 to CB-4 in the stack system.

Figure 5:
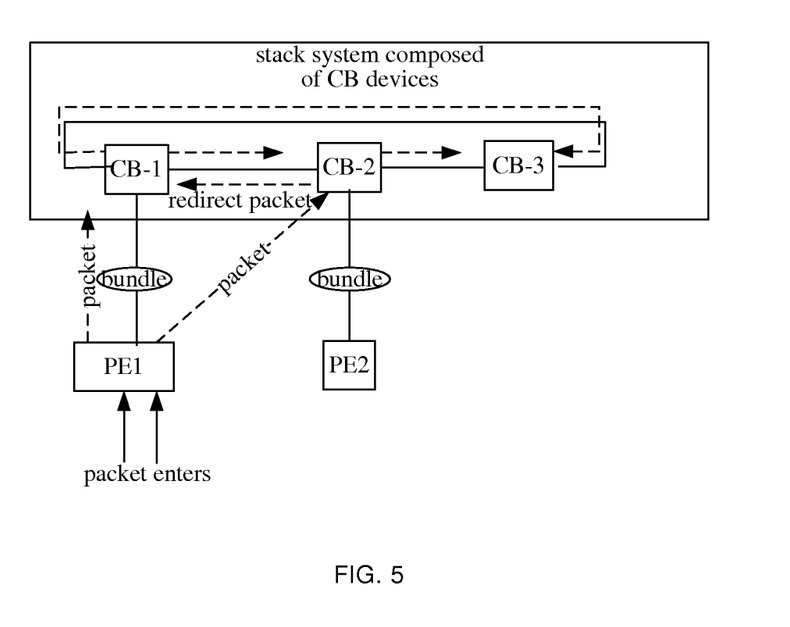
FIG. 5 is a schematic diagram illustrating forwarding of a non-unicast packet according to an example of the present disclosure.

According to the description of (1), if the optimized paths from CB-1 to CB-2, CB-3 and CB-4 shown in FIG. 4 are CB-1→CB-2, CB-1→CB-2→CB-3 and CB-1→CB-4 respectively, the forwarding paths used by CB-1 in the stack system are CB-1→CB-2→CB-3 and CB-1→CB-4. FIG. 5 shows the CB-PE network of FIG. 4 and also shows the forwarding paths. The dashed lines in FIG. 5 show the forwarding paths of non-unicast packet when CB-1 is taken as the source CB device. When another CB device in the stack system is taken as the source CB device, the forwarding paths of non-unicast packet in the stack system are determined according to the processing performed when CB-1 is taken as the source CB device.

In an example, the stack port receiving the non-unicast packet does not forward the non-unicast packet to the CB device sending the non-unicast packet any more. Accordingly, if the non-unicast packet is forwarded through the forwarding path specified in the above example, a loop may be avoided in the stack system.

Thus, the method flowchart shown in FIG. 3 ends.

The method flowchart shown in FIG. 3 is further described hereinafter with reference to an example.

The CB-PE network shown in FIG. 4 is taken as an example. In this example, PE-1 is bundled with CB-1, PE-2 is bundled with CB-2, and the forwarding path of non-unicast packet that is specified for CB-1 taken as the source CB device is CB-1→CB-2→CB-3 and CB-1→CB-4. When CB-1 receives, through a PE port 413 connected to PE-1, a non-unicast packet sent by PE-1, CB-1 finds that it has been bundled with PE-1 sending the non-unicast packet, and thus CB-1 is taken as the source CB device and sends the received non-unicast packet through stack ports 411 and 412 of CB-1. In an example, the non-unicast packet sent by CB-1 taken as the source CB device may include an identity indicating that CB-1 is taken as the source CB device.

CB-2 has recorded information that PE-1 sending the non-unicast packet is bundled with CB-1, and thus PE-1 sending the non-unicast packet is not bundled with CB-2. When CB-2 receives, through a PE port 423 connected to PE-1, a non-unicast packet sent by PE-1, CB-2 may determine that it is not bundled with PE-1 sending the non-unicast packet. CB-2 selects a stack port 421 of CB-2 according to the shortest path and redirects the received non-unicast packet to CB-1 through the stack port 421. The forwarding path of the non-unicast packet is shown by dashed lines in FIG. 4. When CB-1 receives, through the stack port 412, the non-unicast packet that is sent by PE-1 and redirected by CB-2, CB-1 is taken as the source CB device and sends the non-unicast packet through the stack ports 411 and 412 of CB-1. In an example, the non-unicast packet that is sent by CB-1 taken as the source CB device contains an identity indicating that CB-1 is taken as the source CB device.

When CB-2 receives, through the stack port 421, the non-unicast packet that is sent by CB-1 taken as the source CB device, CB-2 determines according to its local storage that the forwarding path of the non-unicast packet in the stack system is CB-1→CB-2→CB-3 and CB-1→CB-4. CB-2 finds that a stack port 422 connected to CB-3 is located on the forwarding path of the non-unicast packet, and thus continues to send the received non-unicast packet through the stack port 422. CB-2 finds that the stack port 421 connected to CB-1 is not located on the forwarding path of the non-unicast packet, and thus does not send the received non-unicast packet through the stack port 421.

When CB-4 receives, through a stack port 442, the non-unicast packet that is sent by CB-1 taken as the source CB device, CB-4 determines according to its local storage that the forwarding path of the non-unicast packet in the stack system is CB-1→CB-2→CB-3 and CB-1→CB-4. CB-4 finds that stack ports 441 and 442 are both not located on the forwarding path of the non-unicast packet, and thus does not send the received non-unicast packet through the stack ports 441 and 442.

When CB-3 receives, through stack ports 431 and 432, the non-unicast packet that is sent by CB-1 taken as the source CB device, CB-3 determines according to its local storage that the forwarding path of the non-unicast packet in the stack system is CB-1→CB-2→CB-3 and CB-1→CB-4. CB-3 finds that the stack ports 431 and 432 are both not located on the forwarding path of the non-unicast packet, and thus does not send the received non-unicast packet through the stack ports 431 and 432.

If the non-unicast packet is forwarded among CB devices in this way, a loop may be avoided in the stack system.

In an example, in a header of a non-unicast packet that is sent by a PE device to a CB device in the stack system, a destination port number and a destination chip number may be contained. The header may be a Higig (HG) header. Herein, the HG header is a kind of inner header of a packet processed by a chip. In an example, the destination port number is a proxy port identity corresponding to a downlink port of the stack system, and the destination chip number is a proxy chip identity corresponding to the downlink port of the stack system.

In an example, a process of selecting one of the stack ports of the CB device according to the shortest path and redirecting the non-unicast packet through the selected stack port to the CB device bundled with the PE device sending the non-unicast packet may be implemented as follows.

The destination chip number and the destination port number contained in the header of the non-unicast packet are respectively modified into a designated chip number and a designated port number on the CB device bundled with the PE device sending the non-unicast packet, and selects one of stack ports of the CB device according to the shortest path and redirects the modified non-unicast packet through the selected stack port to the CB device bundled with the PE device sending the non-unicast packet. In an example, each CB device in the stack system has a designated chip number and a designated port number that are respectively different from those of another CB device.

In an example, if a middle CB device located on the shortest path receives, through a stack port of the middle CB device, a redirected non-unicast packet, the middle CB device selects one of stack ports of the middle CB device according to the shortest path and redirects the non-unicast packet through the selected stack port to the CB device bundled with the PE device sending the non-unicast packet. In this case, the middle CB device does not modify the header of the non-unicast packet. The middle CB device on the shortest path may be any CB device on the shortest path except the CB device receiving the non-unicast packet and the CB device bundled with the PE device sending the non-unicast packet.

In an example, a process of sending the non-unicast packet through all stack ports of the CB device taken as the source CB device may be implemented as follows.

When the CB device receives, through the PE port of the CB device, the non-unicast packet sent by the PE device bundled with the CB device, the CB device determines the type of the received non-unicast packet. When the CB device receives, through the stack port of the CB device, the non-unicast packet redirected to the CB device and the CB device is bundled with the PE device sending the non-unicast packet, the CB device also determines the type of the received non-unicast packet.

When the CB device determines that the received non-unicast packet is a broadcast packet, the CB device deletes the destination chip number and the destination port number of the received non-unicast packet, adds an identity for denoting the broadcast packet into the header of the received non-unicast packet and sends the non-unicast packet through all stack ports of the CB device. In this case, the CB device is taken as the source CB device. The broadcast packet may be a normal broadcast packet, an unknown-unicast packet and unknown-multicast packet.

When the CB device determines that the received non-unicast packet is a multicast packet, the CB device deletes the destination chip number and the destination port number of the received non-unicast packet, determines a multicast group identity corresponding to the non-unicast packet according to a MAC address and an IP address contained in the non-unicast packet, adds the multicast group identity and an identity for denoting the multicast packet into the header of the received non-unicast packet and sends the non-unicast packet through all stack ports of the CB device. In this case, the CB device is taken as the source CB device.

In an example, when the CB device sends the non-unicast packet through all stack ports of the CB device, the method may further include sending the non-unicast packet through all service ports of the CB device. When sending the non-unicast packet through all service ports of the CB device, the CB device removes the header of the non-unicast packet. When sending the non-unicast packet through all stack ports of the CB device, the CB device may not remove the header of the non-unicast packet. In this way, each of all non-unicast packets sent through the stack ports contains a header.

The method described in the above example of the present disclosure may be applied to any CB device in the stack system. When the switch chip of the CB device receives a non-unicast packet from a PE device through a stack port, the switch chip sends the non-unicast packet to the TM chip. After the non-unicast packet is returned to the switch chip, according to the forwarding path of the non-unicast packet, the switch chip may prevent the stack port receiving the non-unicast packet to forward the non-unicast packet to the CB device sending the non-unicast packet. In this way, a loop may be avoided in the stack system. In an example, the forwarding path of the non-unicast packet may be configured on a connection port between the switch chip and the TM chip according to an Access Control List (ACL) rule.

The forgoing describes the method provided by the example of the present disclosure, and a CB device is described hereinafter according to an example of the present disclosure.

Figure 6:
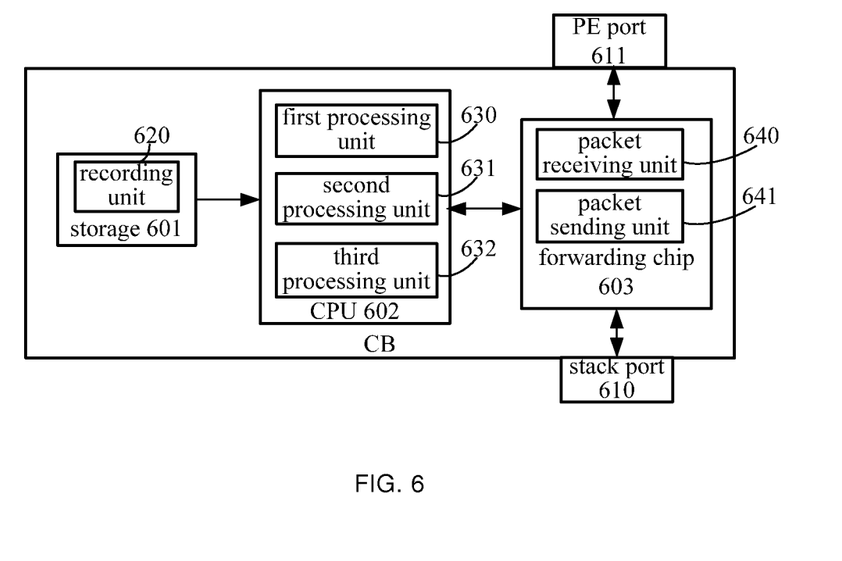
FIG. 6 is a schematic diagram illustrating a structure of a CB device according to an example of the present disclosure.

FIG. 6 is a schematic diagram illustrating a structure of a CB device according to an example of the present disclosure and this structure may be used in any of the CB devices described above and shown in the figures. The CB device is connected to other adjacent CB devices through stack ports, including a stack port 610, to form a stack system. As shown in FIG. 6, the CB device may include storage 601, a CPU 602 and a forwarding chip 603.

The storage 601 may be a non-transitory computer readable storage medium. Also, any of the units shown in FIG. 6 may comprise hardware and/or computer readable instructions stored on the storage 601 and executed by hardware, such as a processor in the CPU 602, to perform its functions. The storage 601 may include a recording unit 620. The recording unit 620 may record information of PE device bundled with the CB device, and record a forwarding path of non-unicast packet when another CB device is taken as a source CB device in the storage 601. The information may indicate that it is through the CB device that all non-unicast packets sent by the PE device bundled with the CB device enters the stack system and the non-unicast packets are all forwarded in the stack system by the CB device, wherein the CB device is taken as a source CB device. The forwarding path of non-unicast packet is specified to prevent a loop in the stack system.

The CPU 602 may include a first processing unit 630, a second processing unit 631 and a third processing unit 632.

The forwarding chip 603 may include a packet receiving unit 640 and a packet sending unit 641.

The packet receiving unit 640 may receive non-unicast packets.

When the packet receiving unit 640 receives a non-unicast packet through a PE port, such as a PE port 611, of the CB device through which the CB device is connected to a PE device, the first processing unit 630 may determine according to the information recorded by the recording unit 620 whether the CB device is bundled with a PE device sending the non-unicast packet. If the CB device is not bundled with the PE device sending the non-unicast packet, the first processing unit 630 selects one of the stack ports of the CB device according to the shortest path, and sends an instruction to the packet sending unit 641.

The packet sending unit 641 may redirect the non-unicast packet to a CB device bundled with the PE device sending the non-unicast packet when receiving the instruction from the first processing unit 630.

In an example, when the packet receiving unit 640 receives a non-unicast packet sent by a PE device bundled with the CB device through the PE port of the CB device, the second processing unit 631 may trigger the packet sending unit 641 to send the non-unicast packet through all stack ports of the CB device, wherein the CB device is taken as the source CB device. In another example, when the packet receiving unit 640 receives a non-unicast packet redirected to the CB device through a stack port of the CB device and the CB device is bundled with the PE device sending the non-unicast packet, the second processing unit 631 may trigger the packet sending unit to send the non-unicast packet through all stack ports of the CB device, wherein the CB device is taken as the source CB device.

When the packet receiving unit receives, through a stack port of the CB device, a non-unicast packet sent by another CB device taken as the source CB device, the third processing unit 632 may determine the forwarding path of the non-unicast packet sent by the source CB device according to the forwarding path recorded by the recording unit 620, trigger the packet sending unit 641 to forward the received non-unicast packet through a stack port of the CB device that is located on the forwarding path of the non-unicast packet, and prevent the packet sending unit 641 from forwarding the received non-unicast packet through a stack port of the CB device that is not located on the forwarding path of the non-unicast packet.

In an example, when a stack port of the CB device receives the non-unicast packet redirected to the CB device but the CB device is not bundled with the PE device sending the non-unicast packet, the second processing unit 631 may select one of stack ports of the CB device according to the shortest path and redirect the non-unicast packet through the selected stack port to the CB device bundled with the PE device sending the non-unicast packet.

In an example, the forwarding path of the non-unicast packet sent by the source CB device is specified according to an optimized path from the source CB device to each of other CB devices in the stack system.

The optimized path from the source CB device to each of other CB devices in the stack system may be determined according to following modes.

If there is one path from the source CB device to each of other CB devices in the stack system, the path may be determined as the optimized path. If there are at least two unequal paths from the source CB device to each of other CB devices in the stack system, the shortest path may be determined as the optimized path. If there are at least two equal paths from the source CB device to each of other CB devices in the stack system, any one of the two equal paths may be determined as the optimized path as long as the loop may be avoided.

In an example, the first processing unit 630 may modify a destination chip number and a destination port number contained in a header of the non-unicast packet into a designated chip number and a designated port number on the CB device bundled with the PE device sending the non-unicast packet, select one of stack ports of the CB device according to the shortest path and redirect the modified non-unicast packet through the selected stack port to the CB device bundled with the PE device sending the non-unicast packet.

In an example, the second processing unit 631 may determine the type of non-unicast packet received by the packet receiving unit.

When determining that the received non-unicast packet is a broadcast packet, the second processing unit 631 may delete the destination chip number and the destination port number of the received non-unicast packet, add an identity for denoting the broadcast packet into the header of the non-unicast packet and trigger the packet sending unit to send the non-unicast packet through all stack ports of the CB device, wherein the CB device is taken as the source CB device.

When determining that the received non-unicast packet is a multicast packet, the second processing unit may delete the destination chip number and the destination port number contained in the received non-unicast packet, determine a multicast group identity corresponding to the non-unicast packet according to a MAC address and an IP address contained in the non-unicast packet, add the multicast group identity and an identity denoting the multicast packet into the header of the received non-unicast packet and trigger the packet sending unit to send the non-unicast packet through all stack ports of the CB device, wherein the CB device is taken as the source CB device.

As can be seen from the above examples, each PE device in the CB-PE network is bundled with one CB device. When the PE device bundled with the CB device sends a non-unicast packet, the CB device is taken as the source CB device and forwards the non-unicast packet in the stack system. The forwarding path of non-unicast packet that is sent by any CB device taken as the source CB device is specified in advance to prevent a loop and is recorded on the CB device. In this way, when each CB device receives a non-unicast packet that is sent by another CB device taken as the source CB device through a stack port, the CB device determines, according to information stored in its local storage, the forwarding path of the received non-unicast packet, forwards the non-unicast packet through a stack port of the CB device that is located on the forwarding path of the non-unicast packet, and does not forward the non-unicast packet through a stack port of the CB device that is not located on the forwarding path of the non-unicast packet. In this way, a loop may be avoided in the stack system.

What is claimed is:

1. A method for preventing a loop in a stack system comprising a plurality of Core Backbone (CB) devices; the CB devices being connected to each other through stack ports and to Port Extender (PE) devices through PE ports; the method comprising:
   a CB device receiving a first non-unicast packet through a PE port connected to a PE device;
   the CB device determining whether the CB device is a designated CB device for the PE device;
      when determining that the CB device is the designated CB device for the PE device, the CB device broadcasting the first non-unicast packet through a plurality of stack ports;
      when determining that the CB device is not the designated CB device for the PE device, the CB device determining which CB device in the stack system is the designated CB device for the PE device, determining a shortest path from the CB device to the designated CB device for the PE device and redirecting the first non-unicast packet by unicast forwarding the first non-unicast packet through a single stack port of the CB device along the shortest path to the designated CB device for the PE device.

2. The method of claim 1, further comprising:
the CB device receiving a second non-unicast packet through a stack port;
determining whether the CB device is a designated CB device for a PE device sending the second non-unicast packet;
when determining that the CB device is the designated CB device for the PE device sending the second non-unicast packet, the CB device broadcasting the second non-unicast packet through the plurality of stack ports;
when determining that the CB device is not the designated CB device for the PE device sending the second non-unicast packet, the CB device determining a shortest forwarding path from the CB device to the designated CB device for the PE device sending the second non-unicast packet, and unicast forwarding the second non-unicast packet along the shortest forwarding path to the designated CB device for the PE device sending the second non-unicast packet.

3. The method of claim 2, wherein the CB device broadcasting the second non-unicast packet through the plurality of stack ports comprises:
the CB device determining a type of the second non-unicast packet;
when determining that the second non-unicast packet is a broadcast packet, the CB device deleting a destination chip number and a destination port number of the second non-unicast packet, adding an identity for denoting the broadcast packet into a header of the second non-unicast packet, and sending the second non-unicast packet through the plurality of stack ports of the CB device; and
when determining that the second non-unicast packet is a multicast packet, the CB device deleting the destination chip number and the destination port number of the second non-unicast packet, determining a multicast group identity corresponding to the second non-unicast packet according to a MAC address and an IP address contained in the second non-unicast packet, adding the multicast group identity and an identity for denoting the multicast packet into the header of the second non-unicast packet, and sending the second non-unicast packet through the plurality of stack ports of the CB device.

4. The method of claim 1, wherein the forwarding path is specified according to an optimized path from the designated CB device to each of other CB devices in the stack system;
the optimized path from the designated CB device to each of other CB devices in the stack system is determined by
when there is one path from the designated CB device to each of other CB devices in the stack system, determining the path as the optimized path,
when there are at least two unequal paths from the designated CB device to each of other CB devices in the stack system, selecting a shortest path of the at least two unequal paths as the optimized path, and
when there are at least two equal paths from the designated CB device to each of other CB devices in the stack system, selecting one of the at least two equal paths as the optimized path as long as the loop is avoided.

5. The method of claim 1, wherein the determining the shortest path from the CB device to the designated CB device for the PE device and redirecting the first non-unicast packet by unicast forwarding the first non-unicast packet through the single stack port of the CB device along the shortest path to the designated CB device for the PE device comprises:
modifying a destination chip number and a destination port number contained in a header of the first non-unicast packet respectively into a designated chip number and a designated port number on the designated CB device for the PE device, selecting one of the plurality of stack ports of the CB device according to the shortest path and redirecting the modified first non-unicast packet through the selected stack port to the designated CB device for the PE device.

6. The method of claim 1, wherein the CB device broadcasting the first non-unicast packet through the plurality of stack ports comprises:
the CB device determining a type of the first non-unicast packet;
when determining that the first non-unicast packet is a broadcast packet, the CB device deleting a destination chip number and a destination port number of the first non-unicast packet, adding an identity for denoting the broadcast packet into a header of the first non-unicast packet, and sending the first non-unicast packet through the plurality of stack ports of the CB device; and
when determining that the first non-unicast packet is a multicast packet, the CB device deleting the destination chip number and the destination port number of the first non-unicast packet, determining a multicast group identity corresponding to the first non-unicast packet according to a MAC address and an IP address contained in the first non-unicast packet, adding the multicast group identity and an identity for denoting the multicast packet into the header of the first non-unicast packet, and sending the first non-unicast packet through the plurality of stack ports of the CB device.

7. A Core Backbone (CB) device in a stack system comprising a plurality of CB devices; the CB devices being connected to each other through stack ports and to Port Extender (PE) devices through PE ports; and the CB device comprising storage, a CPU and a forwarding chip;
the storage is to store information of a PE device when the CB device is a designated CB device for the PE device, and store a forwarding path of non-unicast packet when the CB device is not a designated CB device for the PE device;
when the forwarding chip receives a first non-unicast packet through a PE port connected to the PE device, the CPU is to determine according to the information stored by the storage whether the CB device is a designated CB device for the PE device; when determining that the CB device is the designated CB device for the PE device, to instruct the forwarding chip to broadcast the first non-unicast packet through a plurality of stack ports; when determining that the CB device is not the designated CB device for the PE device, to determine which CB device in the stack system is the designated CB device for the PE device, determine a shortest path from the CB device to the designated CB device for the PE device and instruct the forwarding chip to redirect the first non-unicast packet by unicast forwarding the first non-unicast packet through a single stack port of the CB device along the shortest path to the designated CB device for the PE device.

8. The CB device of claim 7, wherein when the forwarding chip receives a second non-unicast packet through a stack port, the CPU is further to determine according to the information stored by the storage whether the CB device is a designated CB device for a PE device sending the second non-unicast packet; when determining that the CB device is the designated CB device for the PE device sending the second non-unicast packet, to instruct the forwarding chip to broadcast the second non-unicast packet through the plurality of stack ports; when determining that the CB device is not the designated CB device for the PE device sending the second non-unicast packet, to determine a shortest forwarding path from the CB device to the designated CB device for the PE device sending the second non-unicast packet, and instruct the forwarding chip to unicast forward the second non-unicast packet along the shortest forwarding path to the designated CB device for the PE device sending the second non-unicast packet.

9. The CB device of claim 8, wherein the CPU is to determine a type of the second non-unicast packet received by the forwarding chip;
when determining that the second non-unicast packet is a broadcast packet, the CPU is to delete a destination chip number and a destination port number of the second non-unicast packet, add an identity for denoting the broadcast packet into a header of the second non-unicast packet, and send the second non-unicast packet through the plurality of stack ports of the CB device; and
when determining that the second non-unicast packet is a multicast packet, the CPU is to delete the destination chip number and the destination port number of the second non-unicast packet, determine a multicast group identity corresponding to the second non-unicast packet according to a MAC address and an IP address contained in the second non-unicast packet, add the multicast group identity and an identity for denoting the multicast packet into the header of the second non-unicast packet, and send the second non-unicast packet through the plurality of stack ports of the CB device.

10. The CB device of claim 7, wherein the forwarding path is specified according to an optimized path from the designated CB device to each of other CB devices in the stack system;
the optimized path from the designated CB device to each of other CB devices in the stack system is determined by
when there is one path from the designated CB device to each of other CB devices in the stack system, determining the path as the optimized path;
when there are at least two unequal paths from the designated CB device to each of other CB devices in the stack system, selecting a shortest path of the at least two unequal paths as the optimized path; and
when there are at least two equal paths from the designated CB device to each of other CB devices in the stack system, selecting one of the at least two equal paths as the optimized path as long as the loop is avoided.

11. The CB device of claim 7, wherein the CPU is to modify a destination chip number and a destination port number contained in a header of the first non-unicast packet respectively into a designated chip number and a designated port number on the designated CB device for the PE device, select one of the plurality of stack ports of the CB device according to the shortest path and redirect the modified first non-unicast packet through the selected stack port to the designated CB device for the PE device.

12. The CB device of claim 7, wherein the CPU is to determine a type of the first non-unicast packet received by the forwarding chip;
when determining that the first non-unicast packet is a broadcast packet, the CPU is to delete a destination chip number and a destination port number of the first non-unicast packet, add an identity for denoting the broadcast packet into a header of the first non-unicast packet, and send the first non-unicast packet through the plurality of stack ports of the CB device; and
when determining that the first non-unicast packet is a multicast packet, the CPU is to delete the destination chip number and the destination port number of the first non-unicast packet, determine a multicast group identity corresponding to the first non-unicast packet according to a MAC address and an IP address contained in the first non-unicast packet, add the multicast group identity and an identity for denoting the multicast packet into the header of the first non-unicast packet, and send the first non-unicast packet through the plurality of stack ports of the CB device.

* * * * *